ACTIVE OPTICAL RANGING DEVICE PRODUCING MULTIPLE SOURCE IMAGES

Filed March 7, 1967

INVENTOR,
DONALD J. MARY
BY Harry M. Saragovitz
Edward J. Kelly, Herbert Berl
& Peter J. Cobrin
ATTORNEYS United States Patent Office 3,523,732
Patented Aug. 11, 1970

1

2

3,523,732

ACTIVE OPTICAL RANGING DEVICE PRODUCING MULTIPLE SOURCE IMAGES

Donald J. Mary, Hyattsville, Md., assignor to the United States of America as represented by the Secretary of the Army Filed Mar. 7, 1967, Ser. No. 621,743
Int. Cl. G01c 3/08
U.S. Cl. 356—4 9 Claims

ABSTRACT OF THE DISCLOSURE

An axicon lens having a perforated center has a light source located on one side thereof. Within the center of the axicon lens a detector with an appropriate lens is located. A reticle is located immediately adjacent the axicon lens on the same side of the lens as the light source and consists of a pattern of concentrically alternating opaque and transparent rings or zones. Light from the source passing through the transparent zones of the reticle is imaged by the axicon lens into a series of spots along the optical axis on the side of the axicon lens away from the light. As an object approaches the device an electric impulse is generated by the detector each time the object passes through one of the spots of light. Thus, a train of pulses is observed as the object moves through the interval occupied by the source spots. When the appropriate predetermined number of pulses is counted by the detector circuitry a single output pulse is generated indicating the object is a desired distance in front of the axicon lens.

Figures 1, 2:
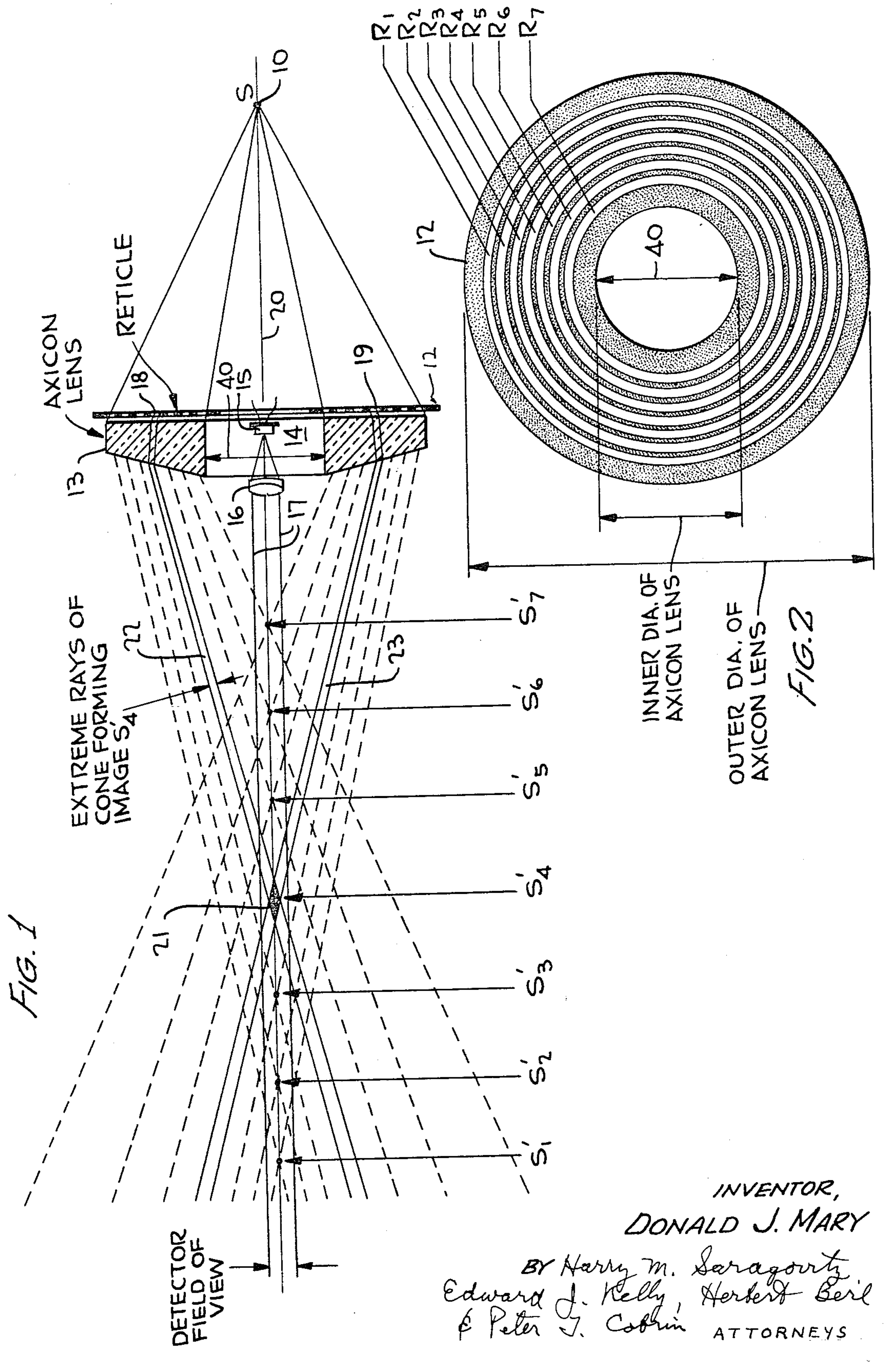

This invention relates to the optic arts and in particular to an optical ranging device particularly adapted for, but not limited to, measuring distances less than 100 feet.

Measurements of ranges relatively close objects (less than 100 feet) present a particular problem if the distance to the object is subjected to rapid variation. When the object is moving, in order to accurately record the distance to the object at a particular instant, the actual measuring of the object distance must be rapidly done so the object will not appreciably move during the measuring period. Prior art devices to measure distance to an object include short range radar and various optical schemes. These devices are generally complex, delicate and/or require long periods of time in which to measure the distance to the objects making them unsuitable for measuring the distances to rapidly moving objects. A particular disadvantage of systems employing mechanical moving parts is the high tolerances required for the accuracy needed and the wear and friction of the moving parts which requires constant maintenance. It is obvious that any system which can be designed to measure distances accurately without employing moving parts will find a wide range of use.

It is therefore an object of this invention to provide means to rapidly determine the distance to a moving object.

It is a further object of the present invention to provide means to determine the distance to an object that utilizes no moving parts and yet is rugged in operation.

Another object of the present invention is to provide means to rapidly determine the distance of a moving object, even when the distance to said object is less than one hundred feet.

A further object of the present invention is to provide means to determine if an object is at a particular distance.

Still another object of the present invention is to provide means to determine the range and velocity of a distant object.

Briefly, in accordance with the present invention, a light from a source passes through a reticle and through an axicon lens and is imaged to a series of light spots along a common optical axis. When an object passes through these light spots, a detector records this giving an indication of the distance of the object to the axicon lens.

Other objects and aspects of the present invention will be apparent from the following description and drawings wherein:

FIG. 1 is a schematic representation of an embodiment of the present invention; and FIG. 2 is an illustration of the reticle used in accordance with the present invention.

In FIG. 1, a light source 10 is shown positioned along a common optical axis 20 and on the right side of a reticle 12. Also positioned along common optical axis 20 is an axicon lens 13 having a center aperture 14. Positioned adjacent center aperture 14 is a detector lens 16 and within aperture 14 a detector 15. Detector 15 could be any of the well known electronic means presently available to detect a series of pulses of light and to produce a signal indicative thereof. An axicon lens is a figure of revolution that has the property that a point source on its axis of revolution is imaged to a line along its optical axis. In the embodiment of FIG. 1 the axis of revolution of axicon lens 13 is identical with common axis 20.

Because of the axicon's ability to transfer a point source to a line image along its axis it does not have a focal length as the term is used in the art. A more detailed description of an axicon can be found in the "Journal of The Optical Society of America," vol. 44, No. 8, published in August 1954, in article entitled "The Axicon, A New Type of Optical Element," by John H. McLeod.

In FIG. 2 reticle 12 is more fully shown. The reticle consists of a series of transparent zones numbered $R_1$, $R_2$, $R_3$, etc., and a series of opaque surfaces surrounding each transparent zone. Reticle 12 has a center aperture 40 having the same diameter as center aperture 14 of axicon lens 13. The outside diameter of reticle 12 matches the outside diameter of axicon lens 13. Because of the ability of an axicon lens to image a point source to a series of points, light 10 will be imaged to a series of points on the left side of axicon lens 13 along common optical axis 20. If reticle 12 has seven transparent sections as shown in FIG. 2, axicon lens 13 will image the light it receives from source 10 into seven points on common optical axis 20 corresponding to the seven transparent zones of reticle 12. The light spots formed along common axis 20 are determined from the light from each transparent zone of the reticle reaching the axicon lens and merging along a point a certain specified distance away from axicon lens 13 as shown by light spot $S_4'$ formed by rays 22 and 23. The light passing through the outside transparent zone on reticle 12, namely transparent zone $R_1$, will be imaged to a light spot $S_1'$ furthest from axicon lens 13 while the light passing through transparent zone $R_2$ will be imaged to light spot $S_2'$ somewhat closer to axicon lens 13 than $S_1'$ along a common optical axis 20. A similar result will occur for the light passing through the rest of the transparent zones of reticle 12. The interval along the optical axis 20 of the light spots are determined by the slope of the axicon lens, the index of refraction of the lens material, the inner diameter of the smallest transparent zone in the reticle, the outer diameter of the largest transparent reticle zone, and the point beyond the axicon lens at which the source 10 is located. While there will be light spots along common optical axis 20 at $S_1'$, $S_2'$, etc., $S_7'$, the spaces between these light spots will be unilluminated since there will be no light directed to these areas from axicon lens 13 as the axicon lens does not receive a continuous stream of light from source 10 but only circular rings from reticle 12 which are imaged to a line of spots along optical axis 20. Detector 15 has been collimated so that its field of view will only cover the area within lines 17 and will not be sensitive to light outside this zone. When an object approaches axicon lens 13 on common optical axis 20 it will pass through a light spot indicated on common optical axis 20 by $S_1'$ and as it continues to approach, it will then go through a dark spot which corresponds to the distance between $S_1'$ and $S_2'$, approach another light spot at $S_2'$ and so on. The detector 15 will generate a pulse each time the object passes through a light spot. By knowing the distance $S_1'$ is from axicon lens 13, it can be seen that the first pulse detector 15 detects and sends a signal indicative thereof, will indicate the object at a certain predetermined distance and so on for two pulses corresponding to the distance $S_2'$ from the axicon lens, etc. The time interval between pulses will be the velocity of the object moving from one light spot to another and thus it can be seen that the frequency of pulses detected by detector 15 is a measurement of the velocity of the object as it goes through the series of light spots.

Obviously, the device can be used to measure the distance of a receding object with equal ease.

Thus it is apparent that I have provided a simple means to detect the distance and velocity of an object from a given point which requires no moving parts and hence should give indefinite lifetime of use without maintenance problems. Similarly, the means I have shown to detect object distance and object velocity are rapid in operation making them suitable for use in short distance measurements where the distance of the object is rapidly changing and time cannot be spent on measuring and recording the distance as the distance to the object will have undergone an appreciable change.

It will be apparent that the embodiments as shown are only exemplary and that various modifications can be made in construction and arrangement within the scope of the invention defined in the appended claims.

I claim as my invention:

1. An optical ranging device comprising:
(a) a light source;
(b) first means to produce a series of light spots from said light source, said first means including an axicon lens, and
(c) second means to detect blacking out of said light spots.

2. A device according to claim 1 wherein a reticle is positioned adjacent said axicon lens between said axicon lens and said light source.

3. A device according to claim 2 wherein said axicon lens has a center aperture wherein said second means are placed.

4. A device according to claim 3 wherein said axicon lens and said light source are positioned along a common optical axis.

5. A device according to claim 4 wherein said axicon lens and said reticle are symmetrical about said common optical axis.

6. A device according to claim 5 wherein said reticle has a plurality of circumferential transparent and opaque sections.

7. A device according to claim 6 wherein said reticle has a center aperture identical in size to said center aperture of said axicon lens.

8. A device according to claim 7 wherein said second means includes a detector and a detector lens.

9. A device according to claim 8 wherein said detector and said detector lens have a collimated field of view.

References Cited

UNITED STATES PATENTS

| | | | |
|---|---|---|---|
| 3,129,424 | 4/1964 | Rabinow | 356—4 XR |
| 3,348,050 | 10/1967 | Bez | 356—4 XR |

RODNEY D. BENNETT, Jr., Primary Examiner

J. P. MORRIS, Assistant Examiner